M. C. SHARPNACK.
FRICTION CLUTCH.
APPLICATION FILED AUG. 17, 1914.

1,154,891. Patented Sept. 28, 1915.

Witnesses.
Wellington H Blewitt
Marguerite Bates

Inventor.
Matthew C. Sharpnack
By Horace & Thomas
Attorneys.

UNITED STATES PATENT OFFICE.

MATTHEW C. SHARPNACK, OF PRESCOTT, ARIZONA.

FRICTION-CLUTCH.

1,154,891.  Specification of Letters Patent.  Patented Sept. 28, 1915.

Application filed August 17, 1914. Serial No. 857,046.

*To all whom it may concern:*

Be it known that I, MATTHEW C. SHARP-NACK, a citizen of the United States, residing at Prescott, in the county of Yavapai, State of Arizona, have invented new and useful Improvements in Friction-Clutches, of which the following is a specification.

This invention relates to a clutch.

It is the object of this invention to provide a clutch which is adapted for use on automobiles and other power propelled vehicles in transmitting rotary motion from the drive shaft to the driven shaft through the engine fly-wheel, and which is so constructed that the throwing in of the clutch will not effect sudden rotation of the driven shaft, thereby obviating the shock usually incident to starting the vehicle.

Another object is to provide a clutch having means for absorbing torsional shocks thereon, whereby said shocks will not be transmitted to the driving and driven parts through the clutch.

A further object is to provide a clutch of the above character which is simple in construction, and which may be readily assembled and applied.

Figure 1:
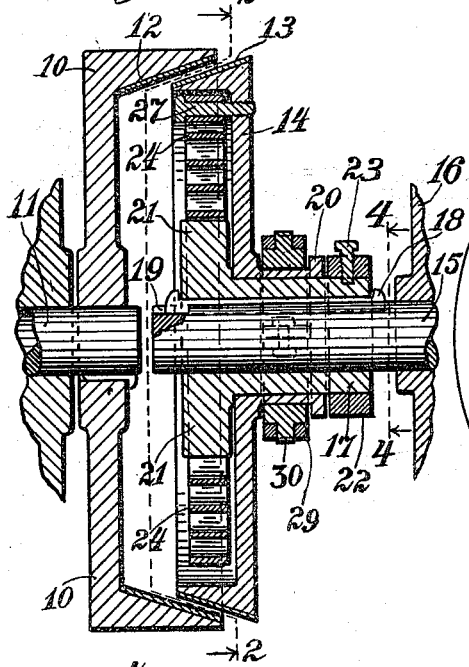
Figure 2:
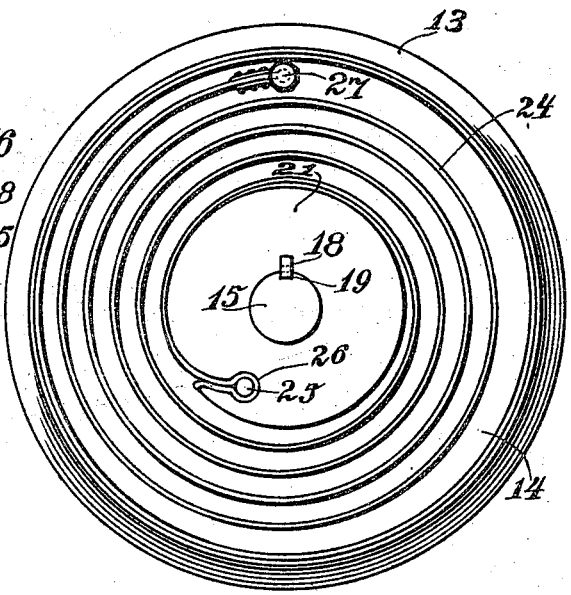
Figure 4:
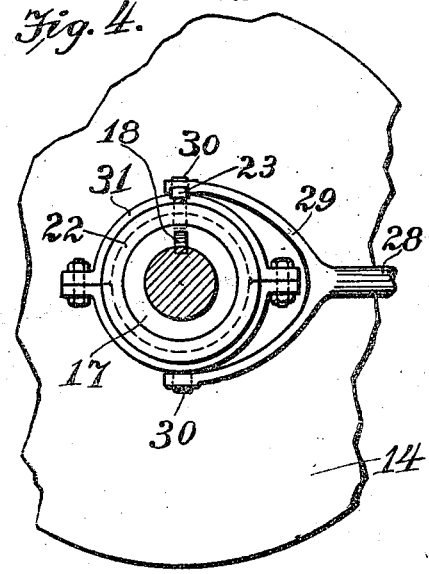
Figure 3:
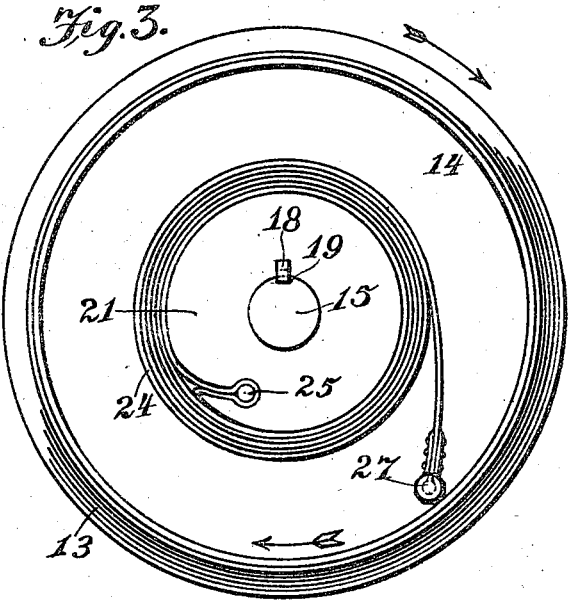

The invention is illustrated in the accompanying drawing, in which:

Figure 1 is a view of the clutch in vertical section illustrating it as applied to the fly-wheel of an engine and showing it in its disengaged position. Fig. 2 is a view in elevation of the face of the clutch as seen on the line 2—2 of Fig. 1 in the direction indicated by the arrows. Fig. 3 is a view corresponding to Fig. 2 showing the clutch in its operative position. Fig. 4 is a detail section and elevation on the line 4—4 of Fig. 1 as seen in the direction indicated by the arrows.

More specifically, 10 indicates the engine fly-wheel mounted on a drive shaft 11 and which fly-wheel is provided with the usual annular flange having an inwardly convergent inner wall 12 adapted to be engaged by the inclined face 13 of the cone clutch member 14. Disposed in alinement with the ends of the drive shaft 11 is a driven shaft 15 which extends into the transmission gear case 16. Slidably mounted on the shaft 15 is a sleeve 17 which is connected to the shaft 15 by means of a key 18 adapted to slide in a key-way 19 formed in the shaft 15 and extending longitudinally thereof.

The sleeve 17 forms a bearing for the hub 20 of the cone clutch member 14 which is revolubly mounted on the sleeve 17 and is held against longitudinal movement in relation to the latter by means of an annular flange 21 mounted on the forward end of the sleeve 17 and extending alongside of the inner wall of the cone clutch member 14; a collar 22 being secured on the sleeve 17 by means of a screw 23 or in any other suitable manner adjacent the outer end of the hub 20.

The cone clutch member 14 is designed to be yieldably connected to the sleeve 17; this connection consisting of a coiled spring 24, one end of which is looped around a pin 25 and engaged in a recess 26 formed in the flange 21. The spring 24 is coiled around the periphery of the flange 21 and its outer end is secured to a stud 27 secured to the inner face of the cone clutch 14; the spring 24 being of sufficient tension to oppose free rotary movement of the cone clutch in relation to the sleeve 17.

The cone clutch is adapted to be shifted to move the clutch face 13 thereon in and out of engagement with the clutch face 12 on the fly-wheel 10; this shifting of the cone clutch being effected by the usual operating lever 28 having a yoke 29 engaging studs 30 on a band 31 encompassing the hub 20 in an annular groove formed on the latter. The operating lever 28 is designed to be rocked horizontally and thereby operates to shift the cone clutch member and the sleeve 17 on which the latter is mounted longitudinally of the shaft 15.

In the operation of the invention, on throwing the cone clutch member 14 into frictional engagement with the revolving fly-wheel 10 the initial rotary movement imparted to the clutch member 14 operates to wind the spring 24 around the flange 21, thus increasing the tension on the spring and at the same time tending to rotate the sleeve 17 and the shaft 15. When the pull on the spring 24 is sufficient to overcome the resistance offered to the rotation of the shaft 15 the latter will be caused to rotate. By this arrangement a sudden rotation of the cone clutch 14 will not cause a sudden starting of the rotation of the shaft 15; the spring 24 absorbing the shock and cushioning the rotation of the shaft 15.

What I claim is:

1. In a clutch, the combination with a shaft, of a clutch member revolubly mounted on said shaft and adapted to be shifted longitudinally thereof, and yieldable means fastened to the clutch member and connected to the shaft through which rotary movement is transmitted between the shaft and clutch member.

2. In a clutch, the combination with a shaft, of a clutch member mounted in revoluble relation to the shaft and reciprocal thereon, and a coiled spring forming a yieldable connection between the clutch member and the shaft, whereby rotary movement of the clutch member will be transmitted to the shaft.

3. In a clutch, the combination of a shaft, a sleeve keyed on said shaft to slide longitudinally thereon, a clutch member revolubly mounted on said sleeve, and a coiled spring wound around the sleeve having one end attached to the sleeve and its opposite end secured to the clutch member.

4. In a clutch, the combination with a shaft, of a clutch member mounted in revoluble relation to the shaft and reciprocal thereon, and a tensioned yieldable member fastened to the clutch member and connected to the shaft and adapted to exert a yieldable pull between the shaft and the clutch member.

5. In a clutch, the combination of a shaft, a sleeve keyed on said shaft to slide longitudinally thereon, a clutch member revolubly mounted on said sleeve, and a yieldable member connecting said sleeve and clutch member, through which rotary movement is transmitted between the shaft and clutch member.

In witness that I claim the foregoing I have hereunto subscribed my name this 25th day of July, 1914.

MATTHEW C. SHARPNACK.

Witnesses:
MARGUERITE BATES,
MARIE BATTEY.